US007996759B2

(12) United States Patent
Elkady (10) Patent No.: US 7,996,759 B2
(45) Date of Patent: *Aug. 9, 2011

(54) DATA INSERTION FROM A DATABASE INTO A FIXED ELECTRONIC TEMPLATE FORM THAT SUPPORTS OVERFLOW DATA

(75) Inventor: Osama Elkady, Foster City, CA (US)

(73) Assignee: Oracle Internatonal Corporation, Redwood Shores, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/227,948

(22) Filed: Sep. 14, 2005

(65) Prior Publication Data

US 2006/0059418 A1    Mar. 16, 2006

Related U.S. Application Data

(60) Provisional application No. 60/610,077, filed on Sep. 14, 2004.

(51) Int. Cl.
   G06F 17/00    (2006.01)
   G06F 17/20    (2006.01)
(52) U.S. Cl. ......... 715/225; 715/226; 715/253; 707/808
(58) Field of Classification Search .......................... None
   See application file for complete search history.

(56) References Cited

U.S. PATENT DOCUMENTS

| | | | | |
|---|---|---|---|---|
| 4,651,288 A | * | 3/1987 | Zeising | 358/1.18 |
| 4,912,669 A | * | 3/1990 | Iwamoto et al. | 715/219 |
| 5,799,115 A | * | 8/1998 | Asano et al. | 382/305 |
| 5,909,570 A | * | 6/1999 | Webber | 703/13 |
| 5,978,787 A | | 11/1999 | Wong et al. | |
| 6,006,242 A | * | 12/1999 | Poole et al. | 715/209 |
| 6,026,433 A | | 2/2000 | D'Arlach et al. | |
| 6,055,522 A | | 4/2000 | Krishna et al. | |
| 6,084,585 A | * | 7/2000 | Kraft et al. | 715/733 |
| 6,088,700 A | * | 7/2000 | Larsen et al. | 715/507 |
| 6,088,702 A | | 7/2000 | Plantz et al. | |
| 6,101,513 A | * | 8/2000 | Shakib et al. | 715/234 |

(Continued)

FOREIGN PATENT DOCUMENTS

WO    WO 01/82202 A2    11/2001

OTHER PUBLICATIONS

S Appleby, Multilingual Information Technonlogy, Jan. 2003, BT Technonlgy Journal vol. 21 No. 1, p. 75-83.*

(Continued)

*Primary Examiner* — Pierre M. Vital
*Assistant Examiner* — Augustine Obisesan
(74) *Attorney, Agent, or Firm* — Kilpatrick Townsend & Stockton LLP (57) ABSTRACT

One embodiment in accordance with the invention relates to inserting data (e.g., XML data) from a database into an electronic template form that includes a table. Furthermore, each table can expand to fit any amount of inserted data and can also expand onto additional pages. The additional pages may have the format of supplemental pages that include the expanded table or that of duplicate pages that also include the other information (e.g., brief description of the table, letterhead, etc.) that was included on the first page. The font size and space can be calculated along with the line wrap for the supplemental page format or duplicate page format.

23 Claims, 7 Drawing Sheets

U.S. PATENT DOCUMENTS

| Patent No. | | Date | Inventor | Ref |
|---|---|---|---|---|
| 6,137,488 A | * | 10/2000 | Kraft et al. | 715/866 |
| 6,141,659 A | * | 10/2000 | Barker et al. | 1/1 |
| 6,144,974 A | * | 11/2000 | Gartland | 715/205 |
| 6,167,517 A | | 12/2000 | Gilchrist et al. | |
| 6,192,380 B1 | * | 2/2001 | Light et al. | 715/507 |
| 6,199,058 B1 | | 3/2001 | Wong et al. | |
| 6,199,079 B1 | * | 3/2001 | Gupta et al. | 715/507 |
| 6,233,684 B1 | | 5/2001 | Stefik et al. | |
| 6,272,506 B1 | | 8/2001 | Bell | |
| 6,490,601 B1 | * | 12/2002 | Markus et al. | 715/507 |
| 6,499,042 B1 | * | 12/2002 | Markus | 715/507 |
| 6,529,904 B1 | | 3/2003 | Elsbernd et al. | |
| 6,532,479 B2 | | 3/2003 | Souder et al. | |
| 6,589,290 B1 | * | 7/2003 | Maxwell et al. | 715/507 |
| 6,623,529 B1 | * | 9/2003 | Lakritz | 715/536 |
| 6,662,340 B2 | * | 12/2003 | Rawat et al. | 715/507 |
| 6,697,804 B1 | | 2/2004 | Elsbernd et al. | |
| 6,708,186 B1 | | 3/2004 | Claborn | |
| 6,832,351 B1 | * | 12/2004 | Batres | 715/234 |
| 6,854,085 B1 | * | 2/2005 | Morse | 715/507 |
| 6,907,564 B1 | | 6/2005 | Burchhardt et al. | |
| 6,910,179 B1 | * | 6/2005 | Pennell et al. | 715/207 |
| 6,996,026 B2 | * | 2/2006 | Brox et al. | 365/189.15 |
| 7,062,706 B2 | * | 6/2006 | Maxwell et al. | 715/507 |
| 7,203,699 B2 | | 4/2007 | Bellamy | |
| 7,296,221 B1 | * | 11/2007 | Treibach-Heck et al. | 715/224 |
| 7,636,887 B1 | | 12/2009 | Kinnucan, Jr. | |
| 7,703,003 B2 | | 4/2010 | Payne et al. | |
| 7,747,938 B2 | | 6/2010 | Elkady | |
| 2002/0059265 A1 | | 5/2002 | Valorose, III | |
| 2002/0083092 A1 | | 6/2002 | Simpson | |
| 2002/0099947 A1 | | 7/2002 | Evans | |
| 2002/0111888 A1 | | 8/2002 | Stanley et al. | |
| 2002/0120628 A1 | | 8/2002 | Hitchcock et al. | |
| 2002/0123980 A1 | | 9/2002 | Jenkins et al. | |
| 2002/0156846 A1 | * | 10/2002 | Rawat et al. | 709/203 |
| 2002/0194221 A1 | | 12/2002 | Strong et al. | |
| 2003/0004993 A1 | | 1/2003 | Templeton et al. | |
| 2003/0014442 A1 | | 1/2003 | Shiigi et al. | |
| 2003/0106021 A1 | | 6/2003 | Mangrola | |
| 2003/0120578 A1 | | 6/2003 | Newman | |
| 2003/0140311 A1 | | 7/2003 | Lemon et al. | |
| 2003/0188260 A1 | * | 10/2003 | Jensen et al. | 715/505 |
| 2003/0212749 A1 | | 11/2003 | Jenkins et al. | |
| 2003/0216978 A1 | | 11/2003 | Sweeney et al. | |
| 2003/0233296 A1 | | 12/2003 | Wagner | |
| 2004/0039757 A1 | * | 2/2004 | McClure | 707/201 |
| 2004/0073868 A1 | | 4/2004 | Easter et al. | |
| 2004/0078271 A1 | | 4/2004 | Morano et al. | |
| 2004/0078282 A1 | * | 4/2004 | Robinson | 705/26 |
| 2004/0083426 A1 | | 4/2004 | Sahu | |
| 2004/0153462 A1 | * | 8/2004 | Bardwell | 707/100 |
| 2004/0153465 A1 | * | 8/2004 | Singleton et al. | 707/100 |
| 2004/0199876 A1 | | 10/2004 | Ethier et al. | |
| 2004/0230569 A1 | * | 11/2004 | Rys et al. | 707/3 |
| 2004/0237030 A1 | | 11/2004 | Malkin | |
| 2004/0237040 A1 | | 11/2004 | Malkin et al. | |
| 2004/0254927 A1 | | 12/2004 | Lang et al. | |
| 2005/0066267 A1 | * | 3/2005 | Kanai | 715/513 |
| 2005/0080814 A1 | * | 4/2005 | Hailey et al. | 707/103 R |
| 2005/0102608 A1 | * | 5/2005 | Batres | 715/505 |
| 2005/0198212 A1 | * | 9/2005 | Zilberfayn et al. | 709/219 |
| 2005/0289114 A1 | * | 12/2005 | Bellamy | 707/2 |
| 2006/0143556 A1 | | 6/2006 | Elkady | |
| 2006/0155632 A1 | | 7/2006 | Cherkas et al. | |
| 2008/0178072 A1 | | 7/2008 | Fiedorowicz et al. | |

OTHER PUBLICATIONS

Gary F. Simons and John V. Thomson, Multilingual data processing in CELLAR environment, 1995 Summer Institute of Linguistics, Inc., Linguistic databases, Mar. 23-24, 1995, University of Groningen.*

RoboForm User Manual, Siber system 1999-2009.*

Oracle Corporation, "Introduction to BLAF Page Templates," Last Updated Apr. 19, 2002, pp. 1-10.

Oracle Corporation, "Notification Page Templates," Last Updated Nov. 21, 2003, pp. 1-11.

Oracle Corporation, "New Feature in Oracle Reports Developer and Reports Server 6i," An Oracle Technical White Paper, Mar. 2000, pp. 1-13.

Nimphius, Frank, Integrating Oracle9iAS Reports in Oracle9iAS Forms, Oracle Corporation, An Oracle Technical White Paper, Sep. 2001, pp. 1-40.

Lankenau, Bill, "Oracle9i Application Server Portal-Product Features," An Oracle White Paper, May 2001, pp. 1-58.

Hardy, M., et al., "Mapping and Displaying Structural Transformations between XML and PDF," Proceedings of the 2002 ACM symposium on Document engineering, Nov. 2002, pp. 95-102.

Oracle Technology Network, "Checklist Templates," [online] as printed from http://otn.oracle.com/tech/blaf/specs/checklist_template.html?_template+/otn/content/print, on Mar. 21, 2004.

* cited by examiner

DATA INSERTION FROM A DATABASE INTO A FIXED ELECTRONIC TEMPLATE FORM THAT SUPPORTS OVERFLOW DATA

CROSS REFERENCE TO RELATED APPLICATIONS

This patent application claims the benefit of the co-pending U.S. Provisional Patent Application No. 60/610,077 entitled "Data Insertion From a Database into a Fixed Electronic Template Form that Supports Overflow Data" by Osama Elkady, filed Sep. 14, 2004, which was assigned to the assignee of the present invention and is hereby incorporated by reference.

BACKGROUND

Large companies, corporations, and businesses can be located within different states of the United States of America and even within diverse countries. As such, these type of business organizations may occasionally have to file divergent kinds of reports with different state and/or country governments. For example, these reports may include tax collection reports or human resource reports. Sometimes, governing bodies may each provide an electronic example of each type of form that is acceptable to filed with it. In this manner, these governing bodies indicate the specific layout of each form they will accept when submitted.

In order for a company to satisfy the governing bodies it is under the jurisdiction of, the company (or an outside vendor) usually exerts a significant amount of time and effort in order to produce electronic forms that replicate the original exemplary forms provided by each of the governing bodies. One reason for exerting all of this time and effort is that if these replica forms are not close enough to the original forms, each of the governing bodies may reject them as unacceptable resulting in the exertion of additional time and effort to correct the rejected forms.

The present invention may address one or more of the above issues.

SUMMARY

One embodiment in accordance with the invention relates to inserting data (e.g., XML data) from a database into an electronic template form that includes a table. Furthermore, each table can expand to fit any amount of inserted data and can also expand onto additional pages. The additional pages may have the format of supplemental pages that include the expanded table or that of duplicate pages that also include the other information (e.g., brief description of the table, letterhead, etc.) that was included on the first page. The font size and space can be calculated along with the line wrap for the supplemental page format or duplicate page format.

In another embodiment, the present invention provides a method for inserting data into a field of a fixed electronic form. The method includes receiving the fixed electronic form page and mapping data to the field of the fixed electronic form page. The data can be merged with the field of the fixed electronic form page based on the mapping. It is determined if there is overflow data that will not fit within the field. Provided there is overflow data that will not fit within the field, an additional electronic document page that includes an extension area of the field can be created to handle the overflow data. The overflow data can be merged with the extension area of the field of the additional electronic document page.

In yet another embodiment, the present invention provides a computer system. The computer system includes a processor and a bus coupled to the processor. Additionally, the computer system includes a memory device coupled to the bus to communicate with the processor for performing a method. For example, the method can include receiving a fixed electronic template form page and binding data of a database to a field of the fixed electronic template form page. The data can be merged with the field of the fixed electronic template form page based on the binding. It is ascertained whether there is overflow data that will not fit within the field. Provided there is the overflow data that will not fit within the field, an additional electronic document page is created that includes an extension area of the field to handle the overflow data. The overflow data can be merged with the extension area of the field of the additional electronic document page.

In still another embodiment, the present invention provides a computer readable medium having computer readable code embodied therein for causing a computer system to perform a method. For example, the method can include receiving a fixed electronic page and linking data to the field of the fixed electronic page. Based on the linking, the data can be merged with the field of the fixed electronic page. It is determined whether there is overflow data that does not fit within the field. Provided there is overflow data that does not fit within the field, an additional electronic document page can be created that includes an extension area of the field to handle the overflow data. The overflow data can be merged with the extension area of the field of the additional electronic document page.

While particular embodiments of the present invention have been specifically described within this summary, it is noted that the invention is not limited to these embodiments. The invention is intended to cover alternatives, modifications and equivalents which may be included within the scope of the invention as defined by the claims.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals may be referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. It is understood that throughout discussions of the present invention, discussions utilizing terms such as "mapping", "merging", "binding", "linking", "determining", "transmitting", "receiving", "generating", "creating", "utilizing", "storing" or the like, can refer to the action and processes of a computing system, or similar electronic computing device, that manipulates and transforms data. The data can be represented as physical (electronic) quantities within the computing system's registers and memories and can be transformed into other data similarly represented as physical quantities within the computing system's memories or registers or other such information storage, transmission, or display devices.

Figure 1:
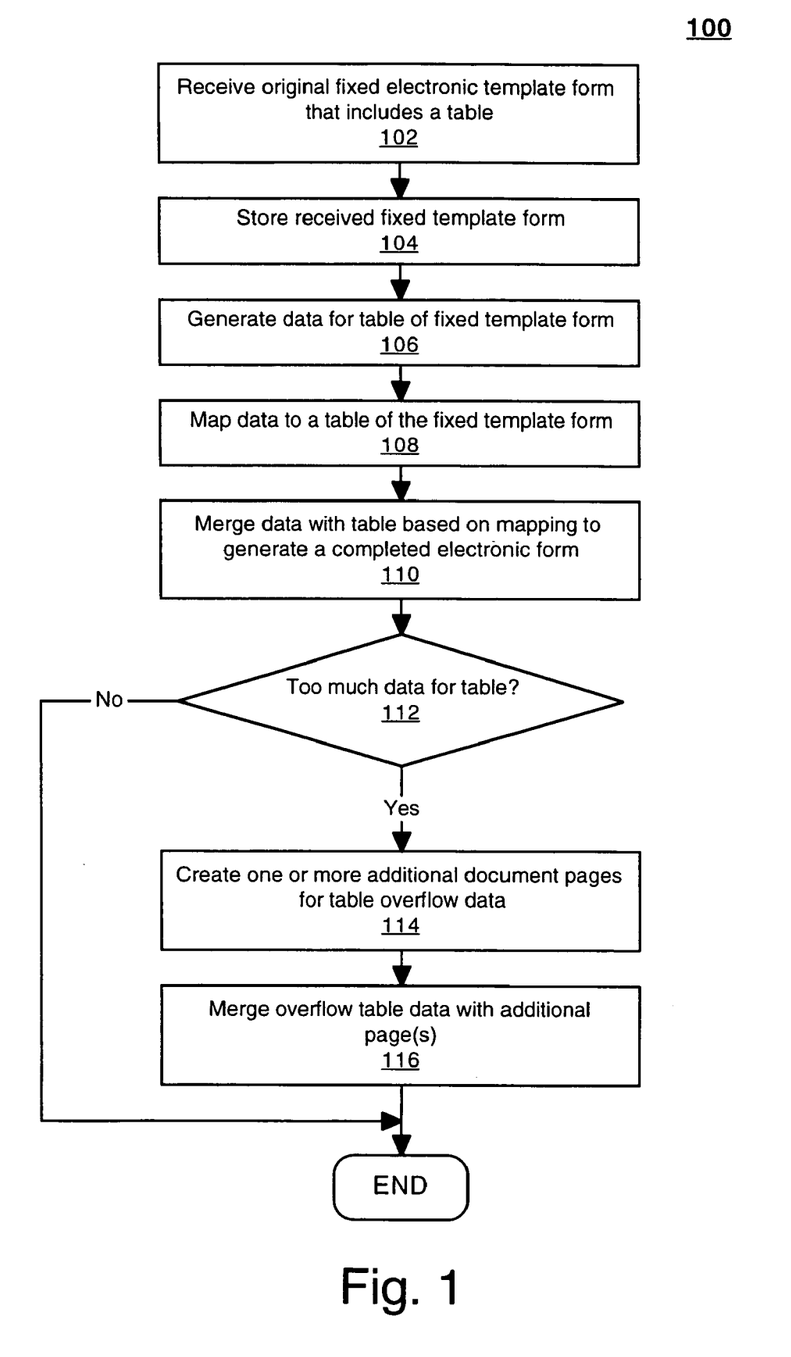
FIG. 1 is a flowchart of a method in accordance with embodiments of the present invention for enabling the insertion of data into a fixed electronic template form that includes a table and handling overflow data.

FIG. 1 is a flowchart of a method 100 in accordance with embodiments of the present invention for enabling the insertion of data into a provided fixed electronic template form that includes a table and handling overflow data. Method 100 includes processes of embodiments of the present invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 100, such operations are exemplary. That is, method 100 may not include all of the operations illustrated by FIG. 1. Also, method 100 may include various other operations and/or variations of the operations shown by FIG. 1. It is noted that the operations of method 100 can be performed by software, by firmware, by hardware or by any combination thereof.

Method 100 enables the insertion of data into a provided fixed electronic template form and handling overflow data. Specifically, an electronic original fixed template form that includes a table can be received and then stored for subsequent use. Data can then be generated (or gathered) that are associated with the table of the received fixed electronic template form. It is noted that the data can be generated (or gathered) even before the fixed electronic template form is received or stored. The data are mapped to the table location that they correspond with of the fixed template form. Based on this mapping, the data can be merged with their corresponding table of the fixed template form in order to generate an electronic form which has been completed (or filled out). It can be determined whether there is overflow data that will not fit within the table. If not, method 100 can be exited. However, if there is overflow data, one or more additional electronic document pages can be created for the table overflow data. Then the overflow data can be merged with the additional electronic page(s). As such, the completed electronic document may then be viewed, printed out, stored, and/or transmitted to one or more locations (e.g., for submission).

It is noted that the fixed template form of method 100 can have space for multiple rows in a table, but the table can be limited to a set of rows that fit on a document page. If there is overflow data that extends beyond that page, method 100 can enable the table and its overflow data to span across one or more additional electronic document pages. Furthermore, method 100 can enable the additional electronic document pages to preserve (or retain) other information or data that is the same on every page of the document. Moreover, method 100 can support more than one table in each electronic document page and/or one or more table headers on every additional electronic page for one or more tables. Method 100 can also support grouping of data associated with a fixed template table on its first electronic page along with every additional electronic page so, for example, a department name or number can appear once on the left for all employees. Additionally, method 100 can also support nested tables of a fixed template form on its first electronic page along with every additional electronic page.

At operation 102 of FIG. 1, an original fixed electronic template form can be received that includes one or more tables that may include one or more fields. It is understood that operation 102 may be modified such that a multitude of original fixed electronic template forms are received. The fixed electronic template form(s) can be implemented in a wide variety of ways. For example, the original fixed electronic template form(s) may be implemented with, but not limited to, the Portable Document Format (PDF) developed by Adobe Systems Incorporated, and the like. The original fixed electronic template form(s) may be provided by, but is not limited to, a state government, a county government, a city government, a country government, one or more agencies of a government, a company, a business, a corporation, and/or an organization. Operation 102 can be implemented in a wide variety of ways. For example, the original fixed electronic template form(s) may be received by a computing device (e.g., 700 of FIG. 7) such as, but not limited to, a database via a communications network (e.g., 602 of FIG. 6). Alternatively, the original fixed electronic template form(s) may be received by a computing device such as, but not limited to, a database from any type of computer readable medium, e.g., compact disc (CD), digital versatile disc (DVD), a portable memory device, and the like. Note that operation 102 can be implemented in any manner similar to that described herein, but is not limited to such.

At operation 104, the received fixed electronic template form(s) can be stored for subsequent use. It is appreciated that operation 104 can be implemented in diverse ways. For example, the received electronic template form(s) can be stored by, but is not limited to, one or more database systems, one or more computer systems, one or more memory devices, and/or in any type of format. Note that operation 104 can be implemented in any manner similar to that described herein, but is not limited to such.

At operation 106 of FIG. 1, data can be generated (or gathered) that are associated with the table(s) of the stored fixed electronic template form(s). The data at operation 106 may be implemented in any data format. For example, the data may be implemented as, but is not limited to, extensible Markup Language (XML) data and the like. Additionally, the gathering of data at operation 106 can include converting various input data sources into a unified standard data format (e.g., XML). In this fashion, data can be received (or retrieved) from existing databases or systems that calculate or manipulate the data that can be merged with one or more fixed electronic forms. Within method 100, it is noted that the generation (or gathering) of the data at operation 106 may take place before operations 102 and/or 104. Additionally, the generation (or gathering) of the data at operation 106 may take place simultaneously or concurrently with operations 102 and/or 104. Operation 106 can be implemented in a wide variety of ways. Note that operation 106 can be implemented in any manner similar to that described herein, but is not limited to such.

Figure 2:
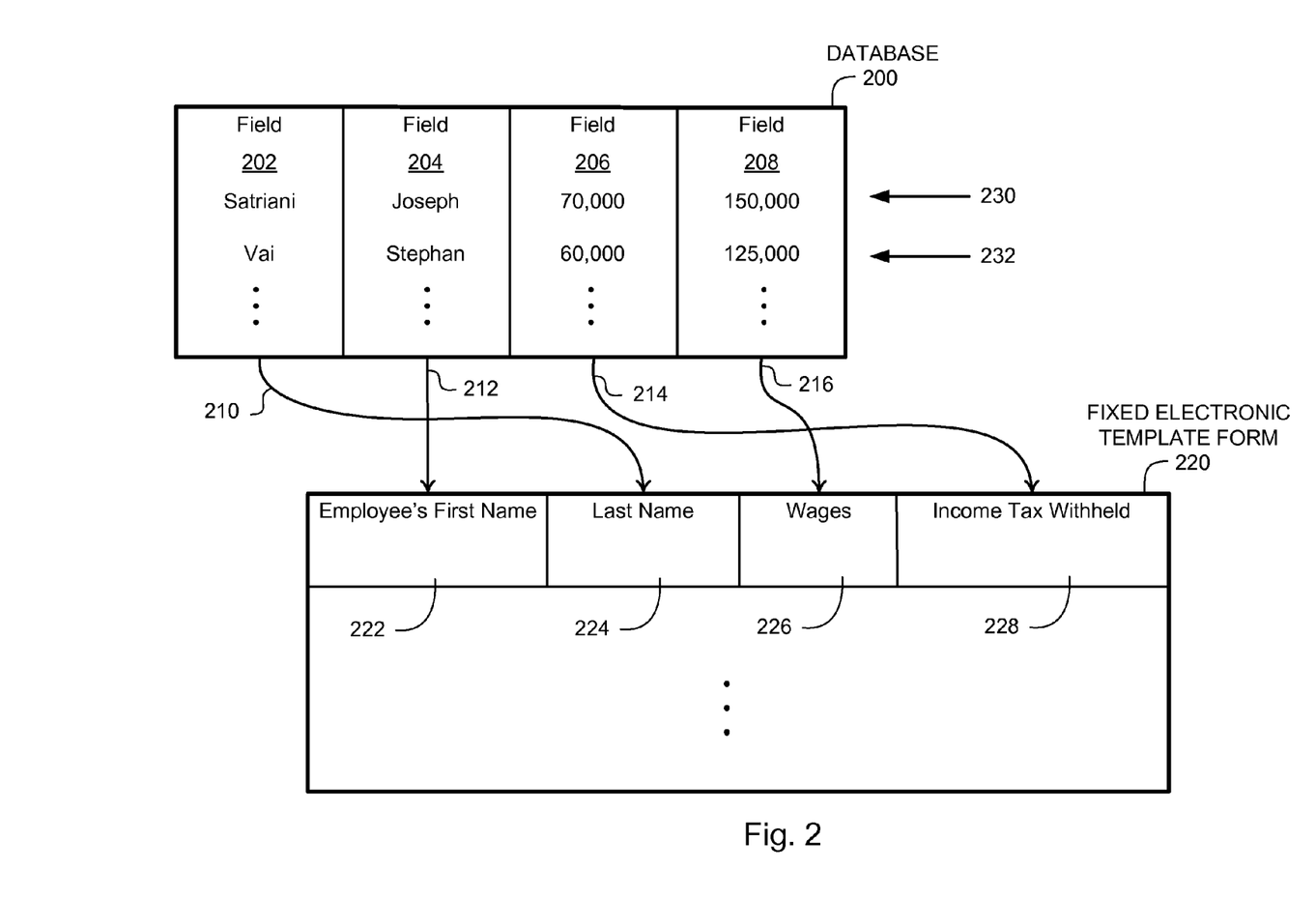
FIG. 2 is an exemplary block diagram of mapping (or data binding) data fields of a database to their corresponding fields of an electronic template table form in accordance with embodiments of the present invention.

At operation 108, the data are mapped (or linked or bound) to any field (or location) of the table(s) that they correspond with within the fixed electronic template form. It is appreciated that operation 108 can be implemented in diverse ways. For example, FIG. 2 is an exemplary block diagram of mapping (or data binding) data fields of a database 200 to their corresponding fields (or locations) of a fixed electronic template table form 220 in accordance with embodiments of the present invention. By mapping in this manner, data of a data field of database 200 can be automatically copied and inserted into its corresponding field of table form 220 in order to fill out (or complete) table 220.

Specifically, data field 202 of database 200 can be mapped (or linked or bound) to a "Last Name" field 224 of the fixed template table form 220 as shown by arrow 210. Additionally, data field 204 of database 200 can be mapped (or linked or bound) to an "Employee's First Name" field 222 of the fixed template table form 220 as shown by arrow 212. Furthermore, data field 206 of database 200 can be mapped (or linked or bound) to a "Income Tax Withheld" field 228 of the fixed template table form 220 as shown by arrow 214. Lastly, data field 208 of database 200 can be mapped (or linked or bound) to a "Wages" field 226 of the fixed template table form 220 as shown by arrow 216. It is noted that data fields 202, 204, 206 and 208 each includes related data. Additionally, the data along row 230 can be a group of associated data while the data along row 232 can be another group of associated data. As such, when mapped and organized in this manner, a row (e.g., 230 or 232) of associated data may be automatically inserted into their corresponding fields of the fixed template table form 220. In this manner, the fixed template table form 220 may be filled with associated data while preserving the original format of table 220.

It is noted that database 200 can include more or less data fields than that shown in FIG. 2. Furthermore, the fixed electronic template table form 220 can include more or less insertion fields than that shown in FIG. 2.

Note that operation 108 can be implemented in any manner similar to that described herein, but is not limited to such.

At operation 110 of FIG. 1, the data can be merged with their corresponding fields of the fixed template table form based on the mapping (or binding or linking) in order to generate an electronic table which has been completed (or filled out). It is understood that operation 110 can be implemented in a wide variety of ways. For example, the data can be merged at operation 110 with their corresponding fields of the fixed template form(s) along with any additional related electronic template forms. Furthermore, the "filled out" additional related electronic forms can be merged at operation 110 with one or more "filled out" main electronic forms thereby producing one document that can have sequential page numbering.

Alternatively or in addition to, operation 110 can include a determination of the language of the data and then a font can be generated on the fly for one or more character glyphs (or shapes) which can be merged with their corresponding fields of the fixed template form(s). In this manner, the completed electronic form(s) can be displayed and/or printed out without the need for additional fonts and/or special language handling abilities. Operation 110 can include parsing of the electronic fixed template form(s), fetching any information about placeholders, and converting the electronic fixed template form(s) into static text that can be merged with the data to generate a completed (or filled out) electronic form(s). In this fashion, further modification of the completed electronic form(s) by a user can be prevented. As such, sensitive data can be protected. It is appreciated that operation 110 may be implemented in any manner similar to that described herein, but is not limited to such.

At operation 112, a determination can be made as to whether there is overflow data that will not fit within the electronic table template. If it is determined at operation 112 that there is not any overflow data, process 100 can be exited. However, if it is determined at operation 112 that there is overflow data that will not fit within the electronic table template, process 100 proceeds to operation 114.

At operation 114 of FIG. 1, one or more additional electronic document pages can be created that include the table formatting for the table overflow data. It is understood that operation 114 can be implemented in a wide variety of ways. For example, the additional electronic document pages may be created by duplicating the complete format and static information or data (e.g., letterhead information, description of the data, etc.) of the first template page that included the table. This duplication process may include calculating the font size and/or spacing along with the line wrap for the additional electronic document pages. Note that each additional electronic document page can include one or more areas for further table formatting (where data can later be inserted) along with one or more areas for static information or data. One way of accomplishing this can be to designate beforehand any table formatting areas of each additional electronic page along with any static areas. In this manner, header and/or footer information can be repeated on every additional electronic page. It is noted that operation 114 can enable a user (e.g., via a user interface) to designate any table formatting areas of each additional electronic page together with any static areas. For example, a user can be enabled to add two markups (or designators or indicators) to an additional electronic page that indicate "body-start" and "body-end" for a table formatting area.

Operation 114 can be implemented to supported multiple tables, nested tables, grouping, and other advanced features. For example, every set of fields (e.g., 222, 224, 226, and 228) on one row can be marked together to indicated that they are part of a table (e.g., 220) and they form one row of that table. In this manner, the X-position and width of each field can be reserved, and the data can be wrapped to fit in the field width. After that, the new Y-position for the second row can be calculated based on the maximum height for the fields in that row. This process can be repeated until the height for the table body area has been filled or used. Then a new additional electronic page, e.g., with a header and/or a footer, can be duplicated and data can subsequently (at operation 116) be drawn into this page. It is appreciated that one or more rows in a table can be marked as a table header so that this special row can be repeated on each additional electronic page until no more data are available for this table.

Alternatively, the additional electronic document pages may be created at operation 114 by creating one or more supplemental pages that include continued table formatting without including any static information or data (e.g., letterhead information, description of the data, etc.) found within the first template page. In this manner, the subsequent pages can appear to be a continuation of the template table of the first document page. This supplemental page process may include calculating the font size and/or spacing along with the line wrap for the additional electronic document pages. Note that the additional electronic document pages that include continued table formatting can be implemented in any manner similar to that described here, but is not limited to such. It is appreciated that operation 114 can be implemented in any manner similar to that described herein, but is not limited to such.

At operation 116 of FIG. 1, the overflow data can be merged with their corresponding fields of the fixed template table form of the additional electronic page(s) based on the mapping (or binding or linking) in order to generate an electronic table template document which has been completed (or filled out). It is understood that operation 116 can be implemented in diverse ways. For example, one row of a fixed electronic template table form of the additional electronic page(s) can be "split" into multiple groups (or fields) thereby enabling overflow data associated with a first group (or field) to be merged with its corresponding field of the "fixed" electronic template table. Next, overflow data associated with a second group (or field) can be merged with its corresponding field of the "fixed" template table, and so forth. In this manner, the overflow data can be merged more efficiently with their corresponding fields of the fixed template table form of the additional electronic page(s). Note that if any field (or column) of a template table form includes the same data (or substantially the same data) for each row, it can be more efficient to utilize this multiple groups technique at operation 116. The operation 116 can be implemented in any manner similar to that described herein, but is not limited to such. It is appreciated that the splitting of a row of a fixed electronic template table form of the additional electronic page(s) into multiple groups (or fields) as described with reference to operation 116 can also be implemented in a similar manner at operation 110. At the completion of operation 116, process 100 can be exited.

Upon exiting process 100, the completed electronic template document may then be viewed, printed out, stored, and/or transmitted to one or more locations (e.g., for submission). For example, the completed electronic form document may be electronically filed via e-mail (electronic mail) or uploaded to a governing body. This is beneficial to the receiving organization because it enables them to extract the data from the submitted completed electronic form document. Note that the completed electronic document can be encrypted before being output in order to prevent any unauthorized modification of the completed electronic document. It is understood that this type of operation can be an optional operation of process 100. Furthermore, the completed electronic document can be stored (e.g., for subsequent use or transmission). It is further noted that, method 100 enables a user (or customer) to utilize an original template, and add information to it in order to make it usable for things like invoices, purchase orders, check printing, and the like. Additionally, method 100 can preserve (or retain) the same formatting that may be mandated by governments or other standards bodies, and the like.

It is noted that process 100 of FIG. 1 is able to receive different fixed electronic template forms without utilizing any additional resources. Furthermore, since process 100 can receive updated fixed electronic template forms, it involves minimum maintenance to those forms. Additionally, if process 100 receives many different fixed electronic template forms each having a different layout, a super set of data (e.g., XML data) can be utilized to fill out each of these different forms. As such, many different forms can be filled out with the same data. Alternatively, a super set of data can include different subcategories of data wherein each may be utilized to fill out a different fixed electronic template form.

Figure 3:
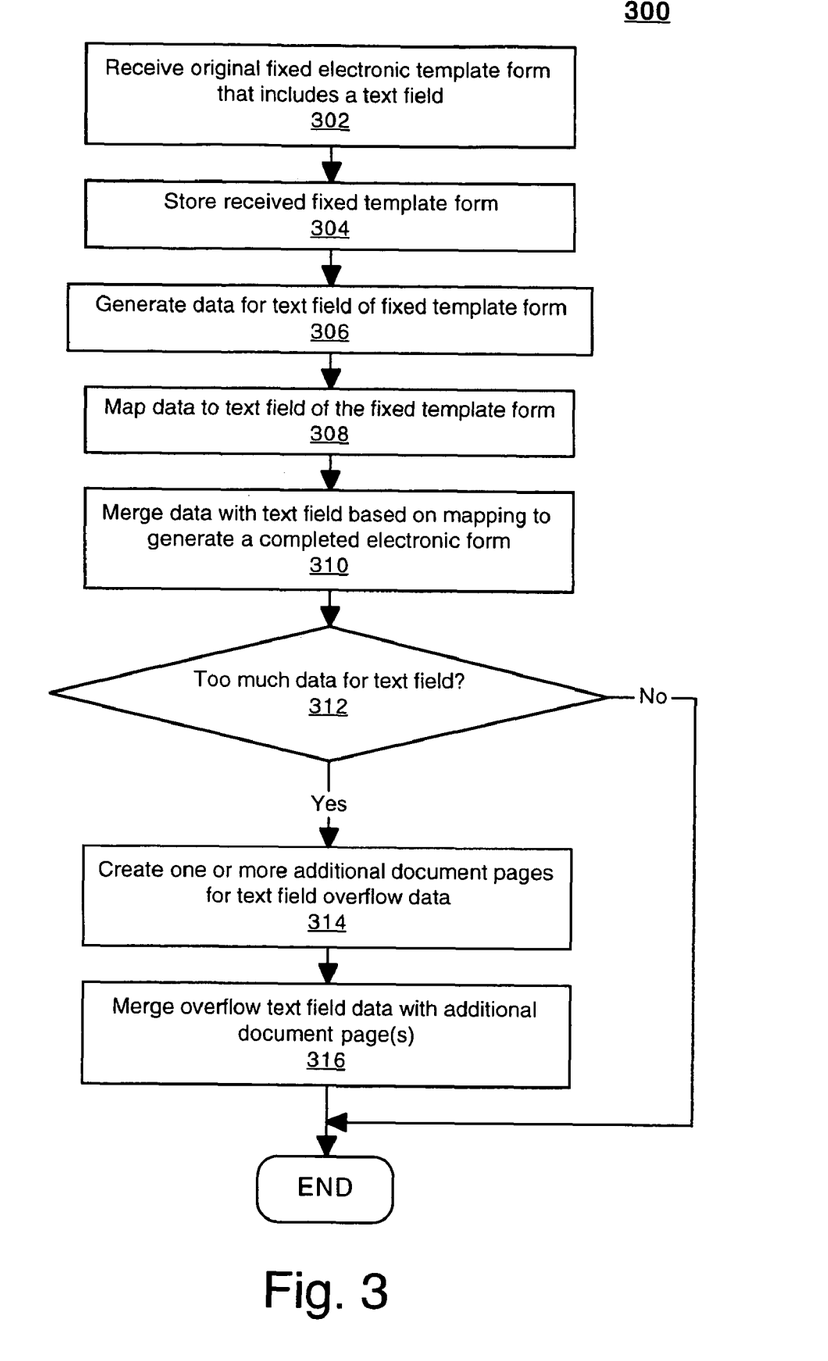
FIG. 3 is a flowchart of a method in accordance with embodiments of the present invention for enabling the insertion of data into a fixed electronic template form that includes a text field and handling overflow data.

FIG. 3 is a flowchart of a method 300 in accordance with embodiments of the present invention for enabling the insertion of data into a provided fixed electronic template form that includes a text field and handling overflow data. Method 300 includes processes of embodiments of the present invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 300, such operations are exemplary. That is, method 300 may not include all of the operations illustrated by FIG. 3. Also, method 300 may include various other operations and/or variations of the operations shown by FIG. 3. It is noted that the operations of method 300 can be performed by software, by firmware, by hardware or by any combination thereof.

Method 300 enables the insertion of data into a provided fixed electronic template form and handling overflow data. Specifically, an electronic original fixed template form that includes a text field can be received and then stored for subsequent use. Data can then be generated (or gathered) that are associated with the text field of the received fixed electronic template form. It is noted that the data can be generated (or gathered) even before the fixed electronic template form is received or stored. The data are mapped to the text field that they correspond with of the fixed template form. Based on this mapping, the data can be merged with their corresponding text field of the fixed template form in order to generate an electronic form which has been completed (or filled out). It can be determined whether there is overflow data that will not fit within the text field of the first page. If not, method 300 can be exited. However, if there is overflow data, one or more additional electronic document pages can be created for the text field overflow data. Then the overflow data can be merged with the additional electronic page(s). As such, the completed electronic document may then be viewed, printed out, stored, and/or transmitted to one or more locations (e.g., for submission).

At operation 302 of FIG. 3, an original fixed electronic template form can be received that includes one or more text fields. It is understood that operation 302 may be modified such that a multitude of original fixed electronic template forms are received. The fixed electronic template form(s) can be implemented in a wide variety of ways. For example, the original fixed electronic template form(s) may be implemented with, but not limited to, the Adobe® PDF and the like. The original fixed electronic template form(s) may be provided by, but not limited to, a state government, a county government, a city government, a country government, one or more agencies of a government, a company, a business, a corporation, and/or an organization. Operation 302 can be implemented in a wide variety of ways. For example, the original fixed electronic template form(s) may be received by a computing device such as, but not limited to, a database via a communications network. Alternatively, the original fixed electronic template form(s) may be received by a computing device such as, but not limited to, a database from any type of computer readable medium (e.g., CD, DVD, a portable memory device, and the like). Note that operation 302 can be implemented in any manner similar to that described herein, but is not limited to such.

At operation 304, the received fixed electronic template form(s) can be stored for subsequent use. It is appreciated that operation 304 can be implemented in diverse ways. For example, the received electronic template form(s) can be stored by, but is not limited to, one or more database systems, one or more computer system, one or more memory devices, and/or in any type of format. Note that operation 304 can be implemented in any manner similar to that described herein, but is not limited to such.

At operation 306 of FIG. 3, data can be generated (or gathered) that are associated with the text field(s) of the stored fixed electronic template form(s). Operation 306 can be implemented in a wide variety of ways. The data at operation 306 may be implemented in any data format. For example, the data may be implemented as, but is not limited to, XML data and the like. Furthermore, the gathering of data at operation 306 can include converting various input data sources into a unified standard data format (e.g., XML). In this manner, data can be received (or retrieved) from existing databases or systems that calculate or manipulate the data that can be merged with one or more fixed electronic forms. Within process 300, it is noted that the generation (or gathering) of the data at operation 306 may take place before operations 302 and/or 304. Additionally, the generation (or gathering) of the data at operation 306 may take place concurrently or simultaneously with operations 302 and/or 304. Note that operation 306 can be implemented in any manner similar to that described herein, but is not limited to such.

At operation 308, the data are mapped (or linked or bound) to the text field that they correspond with within the fixed template form. It is appreciated that operation 308 can be implemented in diverse ways. For example, the mapping at operation 308 may be implemented in a manner similar to that described herein with reference to FIG. 2, but is not limited to such. Note that operation 308 can be implemented in any manner similar to that described herein, but is not limited to such.

At operation 310 of FIG. 3, the data are merged with their corresponding text field of the fixed template table form based on the mapping (or binding or linking) in order to generate an electronic document form which has been completed (or filled out). It is understood that operation 310 can be implemented in a wide variety of ways. For example, the data can be merged at operation 310 with their corresponding fields of the fixed template form(s) along with any additional related electronic template forms. Moreover, the "filled out" additional related electronic forms can be merged at operation 310 with one or more "filled out" main electronic forms thereby producing one document that can have sequential page numbering.

Alternatively or in addition to, the merge at operation 310 can include a determination of the language of the data and then a font can be generated for one or more character glyphs (or shapes) of the data which can be merged with their corresponding fields of the fixed template form(s). In this fashion, the completed electronic form(s) can be displayed and/or printed out without the need for additional fonts and/or special language handling abilities. Operation 310 can include on the fly parsing of the electronic fixed template form(s), fetching any information about placeholders, and converting the electronic fixed template form(s) into static text that can be merged with the data to generate one or more completed (or filled out) electronic forms or documents. In this manner, further modification of the completed electronic form(s) by a user can be prevented. As such, sensitive data can be protected. It is noted that operation 310 can be implemented in any manner similar to that described herein, but is not limited to such.

At operation 312, a determination can be made as to whether there is overflow data that will not fit within the text field of the electronic template. If it is determined at operation 312 that there is not any overflow data, process 300 can be exited. However, if it is determined at operation 312 that there is overflow data that will not fit within the text field of the electronic template, process 300 proceeds to operation 314.

At operation 314 of FIG. 3, one or more additional electronic document pages can be created that include the text field formatting for the overflow data. It is understood that operation 314 can be implemented in a wide variety of ways. For example, the additional electronic document pages may be created by duplicating the complete format and static information or data (e.g., letterhead information, description of the data, etc.) of the first template page that includes the text field. This duplication process may include calculating the font size and/or spacing along with the line wrap for the additional electronic document pages. Alternatively, the additional electronic document pages may be created at operation 314 by creating one or more supplemental pages that include continued text field formatting without including any static information or data (e.g., letterhead information, description of the data, etc.) found within the first template page. In this manner, the subsequent pages can appear to be a continuation of the text field of the template of the first document page. This supplemental page process may include calculating the font size and/or spacing along with the line wrap for the additional electronic document pages. Note that operation 314 can be implemented in any manner similar to that described herein, but is not limited to such.

At operation 316, the overflow data can be merged with their corresponding text field of the additional electronic page(s) of the fixed template form based on the mapping (or binding or linking) in order to generate an electronic table template document which has been completed (or filled out). It is understood that operation 316 can be implemented in diverse ways. Note that operation 316 can be implemented in any manner similar to that described herein, but is not limited to such. At the completion of operation 316, process 300 can be exited.

Upon exiting process 300 of FIG. 3, the completed electronic template document may then be viewed, printed out, stored, and/or transmitted to one or more locations (e.g., for submission). For example, the completed electronic form document may be electronically filed via e-mail (electronic mail) or uploaded to a governing body. This is beneficial to the receiving organization because it enables them to extract the data from the submitted completed electronic form document. Note that the completed electronic form or document can be encrypted before being output to prevent any unauthorized modification of the completed electronic form. It is understood that this type of operation can be an optional operation of process 300. Furthermore, the completed electronic document can be stored (e.g., for subsequent use or transmission).

It is noted that process 300 can receive different fixed electronic template forms without utilizing any additional resources. Furthermore, since process 300 can receive updated fixed electronic template forms, it involves minimum maintenance to those forms. Additionally, if process 300 receives many different fixed electronic template forms each having a different layout, a super set of data (e.g., XML data) can be utilized to fill out each of these different forms. As such, many different forms can be filled out with the same data. Alternatively, a super set of data can include different subcategories of data wherein each may be utilized to fill out a different fixed electronic template form.

Figure 4:
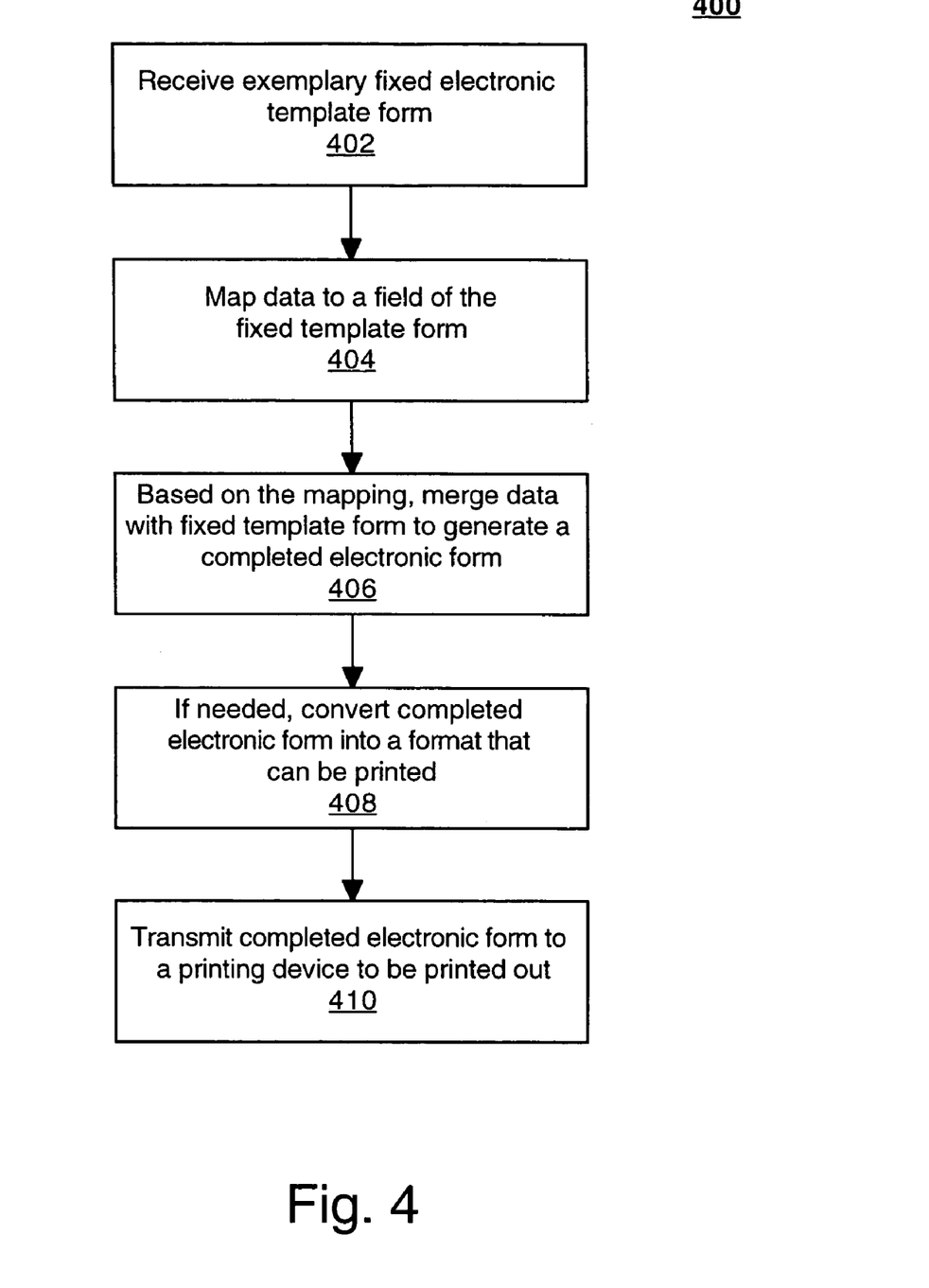
FIG. 4 is a flowchart of a method in accordance with embodiments of the present invention for inserting data into a fixed electronic template form and then printing it from a server.

FIG. 4 is a flowchart of a method 400 in accordance with embodiments of the present invention for inserting data into a fixed electronic template form and then printing it from a server. Method 400 includes processes of embodiments of the present invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 400, such operations are exemplary. That is, method 400 may not include all of the operations illustrated by FIG. 4. Also, method 400 may include various other operations and/or variations of the operations shown by FIG. 4. It is noted that the operations of method 400 can be performed by software, by firmware, by hardware or by any combination thereof.

Method 400 enables inserting data into a field of a fixed electronic template form and then printing it from a server computer. Specifically, a fixed electronic template form can be received for subsequent use. Data can be mapped to the field that it corresponds with of the fixed electronic template form. Based on the mapping, the data can be merged with its corresponding field of the fixed electronic template form in order to generate an electronic form which has been filled out (or completed). If needed, the completed electronic form is then converted into a format that can be printed out by a printer. Subsequently, the completed electronic form can be transmitted (e.g., by a server) to a printer in order to print it out. Upon completion of process 400, the completed electronic form may have been printed out directly from a server.

At operation 402 of FIG. 4, a fixed electronic template form can be received. It is understood that operation 402 may be modified such that a multitude of fixed electronic template forms can be received. The fixed electronic template form can be implemented in diverse ways. For example, the original fixed electronic template form may be implemented with, but not limited to, Adobes PDF and the like. It is noted that the fixed electronic template form may be provided by, but not limited to, a state government, a county government, a city government, a country government, one or more agencies of a government, a company, a business, a corporation, and/or an organization. Operation 402 can be implemented in a wide variety of ways. For example, the fixed electronic template form may be received by a computing device (e.g., 604 of FIG. 6) via a communications network (e.g., 602). Alternatively, the fixed electronic template form may be received by a computing device from any type of computer readable medium (e.g., CD, DVD, a portable memory device, and the like). It is noted that the fixed electronic template form may be implemented similar to the fixed electronic template form described with reference to process 100 (FIG. 1) and/or process 300 (FIG. 3). Note that operation 402 can be implemented in any manner similar to that described herein, but is not limited to such.

At operation 404, data can be mapped (or linked or bound) to a field that it corresponds with of the fixed electronic template form. It is noted that the data may be stored by one or more memory devices or a database. Additionally, the data at operation 404 may be implemented in any data format. For example, the data may be implemented as, but is not limited to, XML data and the like. Moreover, the data at operation 404 may have been converted from various input data sources into a unified standard data format (e.g., XML). In this fashion, data can be received (or retrieved) from existing databases or systems that calculate or manipulate the data which can be merged with one or more fixed electronic forms. Operation 404 can be implemented in a wide variety of ways. For example, the mapping at operation 404 may be implemented in a manner similar to that described herein with reference to FIG. 2, but is not limited to such. It is noted that the data at operation 404 can concurrently include multiple language fonts and/or characters in order to provide multi-lingual support (MLS) to the fixed electronic template form. In this manner, one section of the fixed electronic template form may mapped with Japanese characters while another section may mapped with Italian characters. Note that operation 404 can be implemented in any manner similar to that described herein, but is not limited to such.

At operation 406 of FIG. 4, the data can be merged with its corresponding field of the fixed electronic template form based on the mapping (or linking or binding) in order to generate an electronic form which has been filled out (or completed). It is understood that operation 406 can be implemented in diverse ways. For example, the data can be merged at operation 406 with its corresponding field(s) of the fixed template form(s) along with any additional related electronic template forms. Furthermore, the "filled out" additional related electronic form(s) can be merged at operation 406 with one or more "filled out" main electronic forms thereby producing one document that can have sequential page numbering.

Alternatively or in addition to, operation 406 can include a determination of the language of the data and then a font can be generated on the fly for one or more character glyphs (or shapes) of the data which can be merged with their corresponding field(s) of the fixed template form(s). In this manner, the completed electronic form(s) can be displayed and/or printed out without the need for additional fonts and/or special language handling abilities. Operation 406 can include parsing of the electronic fixed template form(s), fetching any information about placeholders, and converting the electronic fixed template form(s) into static text that is merged with the data to generate a completed (or filled out) electronic form(s). In this fashion, further modification or alteration of the completed electronic form(s) by a user can be prevented. As such, sensitive data can be protected. It is appreciated that operation 406 may be implemented in any manner similar to that described herein, but is not limited to such.

At operation 408, if needed, the completed (or filled out) electronic document form can be converted into a format that is acceptable to a printing device for printing. It is appreciated that operation 408 can be implemented in a wide variety of ways. For example, the conversion process of operation 408 may include, but is not limited to, the subsetting and/or embedding the fonts of the completed electronic document form. It is noted that operation 408 may be optional-if the completed electronic document form is in a format that is acceptable to a printing device for printing. Note that operation 408 can be implemented in any manner similar to that described herein, but is not limited to such.

At operation 410, the completed electronic document form (in the converted format if needed) can be transmitted (e.g., by a server) to a printing device in order for it to be printed out onto some sort of medium, such as but not limited to, paper, card stock, plastic, etc. It is noted that operation 410 can be implemented in diverse ways. For example, the completed electronic form(s) or document(s) can be encrypted at operation 410 before being output to prevent any unauthorized modification of the completed electronic form(s). It is understood that the encryption at operation 112 can be an optional operation of process 400. Furthermore, the completed electronic form(s) can be stored (e.g., for subsequent use or transmission). Note that operation 410 can be implemented in any manner similar to that described herein, but is not limited to such. At the completion of operation 410, process 400 can be exited. It is appreciated that upon exiting process 400, the completed electronic document form may have been printed out directly from a server.

It is noted that process 400 is able to receive different fixed electronic template forms without utilizing any additional resources. Furthermore, since process 400 can receive updated fixed electronic template forms, it involves minimum maintenance to those forms. Additionally, if process 400 receives many different fixed electronic template forms each having a different layout, a super set of data (e.g., XML data) can be utilized to fill out each of these different forms. As such, many different forms can be filled out with the same data and printed out in a batch mode fashion directly from a server. Alternatively, a super set of data can include different subcategories of data wherein each may be utilized to fill out a different fixed electronic template form which can all be printed out in a batch mode fashion directly from a server.

Process 400 can provide multi-lingual support printing of an electronic template from a server which can include font embedding of different language characters. Advantageously, method 400 provides security and/or support for those with disabilities such as screen readers. The method 400 may be utilized for invoices, purchase orders and/or check printing.

Figure 5:
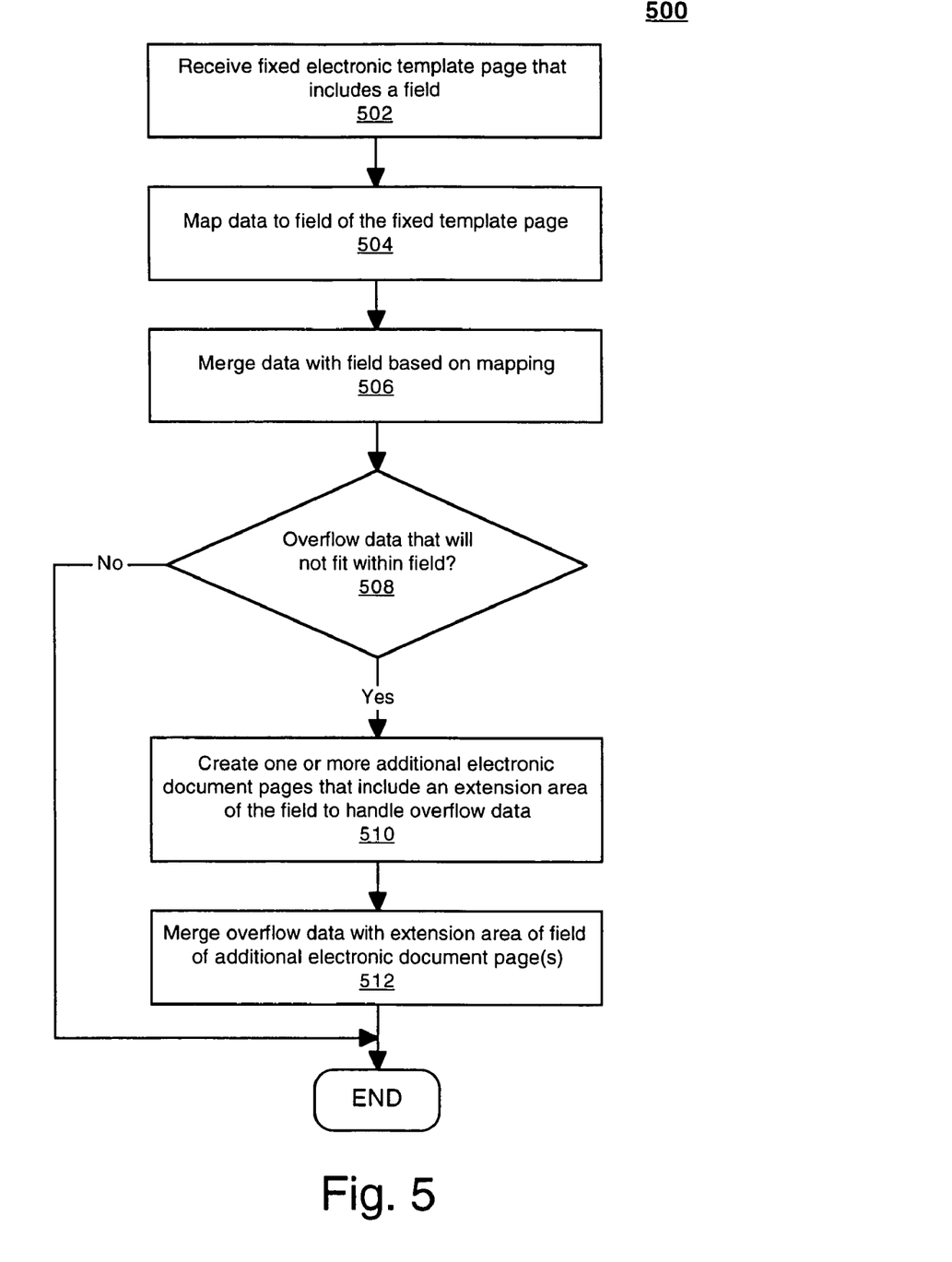
FIG. 5 is a flowchart of a method in accordance with embodiments of the present invention for enabling the insertion of data into a fixed electronic template page.

FIG. 5 is a flowchart of a method 500 in accordance with embodiments of the present invention for enabling the insertion of data into a fixed electronic template page. Method 500 includes processes of embodiments of the present invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 500, such operations are exemplary. That is, method 500 may not include all of the operations illustrated by FIG. 5. Also, method 500 may include various other operations and/or variations of the operations shown by FIG. 5. It is noted that the operations of method 500 can be performed by software, by firmware, by hardware or by any combination thereof.

Method 500 enables the insertion of data into a fixed electronic template page. Specifically, an electronic fixed template page that includes a field can be received. Data can be mapped to the field that they correspond with of the fixed template page. Based on this mapping, the data can be merged with their field of the fixed template page in order to generate an electronic form which has been completed (or filled out). It is determined if there is overflow data that will not fit within the field of the electronic template page. If not, method 500 can be exited. However, if there is overflow data, one or more additional electronic document pages can be created that includes an extension area of the field to handle the overflow data. The overflow data can be merged with the extension area of the field of the additional electronic document page(s). As such, the completed electronic document may then be viewed, printed out, stored, and/or transmitted to one or more locations for submission.

At operation 502 of FIG. 5, a fixed electronic page can be received that includes a field (e.g., table, text field, etc.). It is understood that operation 502 may be modified such that a multitude of fixed electronic template pages are received. The fixed electronic template page(s) can be implemented in a wide variety of ways. For example, the original fixed electronic template page(s) may be implemented with, but not limited to, the Adobe® PDF and the like. The fixed electronic template page(s) may be provided by, but not limited to, a state government, a county government, a city government, a country government, one or more agencies of a government, a company, a business, a corporation, and/or an organization. Operation 502 can be implemented in a wide variety of ways. For example, the original fixed electronic template page(s) may be received by a computing device such as, but not limited to, a database via a communications network. Alternatively, the fixed electronic template page(s) may be received by a computing device such as, but not limited to, a database from any type of computer readable medium (e.g., CD, DVD, a portable memory device, and the like). It is noted that the fixed electronic template page at operation 502 may be implemented in any manner described herein, but is not limited to such. Note that operation 502 can be implemented in any manner similar to that described herein, but is not limited to such.

At operation 504, data (e.g., XML data) can be mapped (or linked or bound) to the field of the fixed electronic template page. It is appreciated that operation 504 can be implemented in diverse ways. For example, operation 504 can be implemented in any manner similar to that described herein, but is not limited to such. Note that the data at operation 504 may have been converted from various input data sources into a unified standard data format (e.g., XML). In this manner, data can be received (or retrieved) from existing databases or systems that calculate or manipulate the data which can be merged with one or more fixed electronic forms.

At operation 506 of FIG. 5, the data can be merged with the field of the fixed electronic template page based on the mapping (or binding or linking) in order to generate an electronic document form which has been completed (or filled out). It is understood that operation 506 can be implemented in a wide variety of ways. For example, operation 506 can be implemented in any manner similar to that described herein, but is not limited to such.

At operation 508, a determination can be made as to whether there is overflow data that will not fit within the field of the electronic template page. If it is determined at operation 508 that there is not any overflow data, process 500 can be exited. However, if it is determined at operation 508 that there is overflow data that will not fit within the field of the electronic template page, process 500 proceeds to operation 510.

At operation 510 of FIG. 5, one or more additional electronic document pages can be created that include an extension area of the field in order to handle the overflow data. It is understood that operation 510 can be implemented in a wide variety of ways. For example, the additional electronic document pages may be created by duplicating the complete format and static information or data (e.g., letterhead information, description of the field, etc.) of the first electronic template page that includes the field. This duplication process may include calculating the font size and/or spacing along with the line wrap for the additional electronic document pages. Alternatively, the additional electronic document pages may be created at operation 510 by creating one or more supplemental pages that include the extension area for the field without including any static information or data (e.g., letterhead information, description of the field, etc.) found on the first electronic template page. In this manner, the subsequent pages can appear to be a continuation of the text field of the template of the first electronic document page. This supplemental page process may include calculating the font size and/or spacing along with the line wrap for the additional electronic document pages. Note that operation 510 can be implemented in any manner similar to that described herein, but is not limited to such.

At operation 512, the overflow data can be merged with the field of the additional electronic document page(s) of the fixed electronic template page which may be based on the mapping (or binding or linking) in order to generate an electronic template document which has been completed (or filled out). It is understood that operation 512 can be implemented in diverse ways. Note that operation 512 can be implemented in any manner similar to that described herein, but is not limited to such. At the completion of operation 512, process 500 can be exited.

Upon exiting process 500 of FIG. 5, the completed electronic template document may then be viewed, printed out, stored, and/or transmitted to one or more locations (e.g., for submission). For example, the completed electronic form document may be electronically filed via e-mail or uploaded to a governing body. This is beneficial to the receiving organization because it enables them to extract the data from the submitted completed electronic form document. Note that the completed electronic form or document can be encrypted before being output to prevent any unauthorized modification of the completed electronic document. It is understood that this type of operation can be an optional operation of process 500. Furthermore, the completed electronic document can be stored (e.g., for subsequent use or transmission). It is noted that the completed electronic document pages of process 500 may be converted (if needed) into a format that can be printed as described herein with reference to FIG. 4. Additionally, the completed electronic document pages of process 500 may be directly printed from a server as described herein with reference to FIG. 4.

Process 500 is able to receive different fixed electronic template pages without utilizing any additional resources. Furthermore, since process 500 can receive updated fixed electronic template pages, it involves minimum maintenance to those pages. Additionally, if process 500 receives many different fixed electronic template pages each having a different layout, a super set of data (e.g., XML data) can be utilized to fill out each of these different pages or forms. As such, many different pages or forms can be filled out with the same data. Alternatively, a super set of data can include different subcategories of data wherein each may be utilized to fill out a different fixed electronic template page or form.

It is noted that process 500 of FIG. 5 may be modified to include one or more additional operations that are described herein with reference to FIGS. 1, 2, 3 and 4.

Embodiments in accordance with the invention can be formed by any combination of methods 100, 300, 400, and/or 500.

Figure 6:
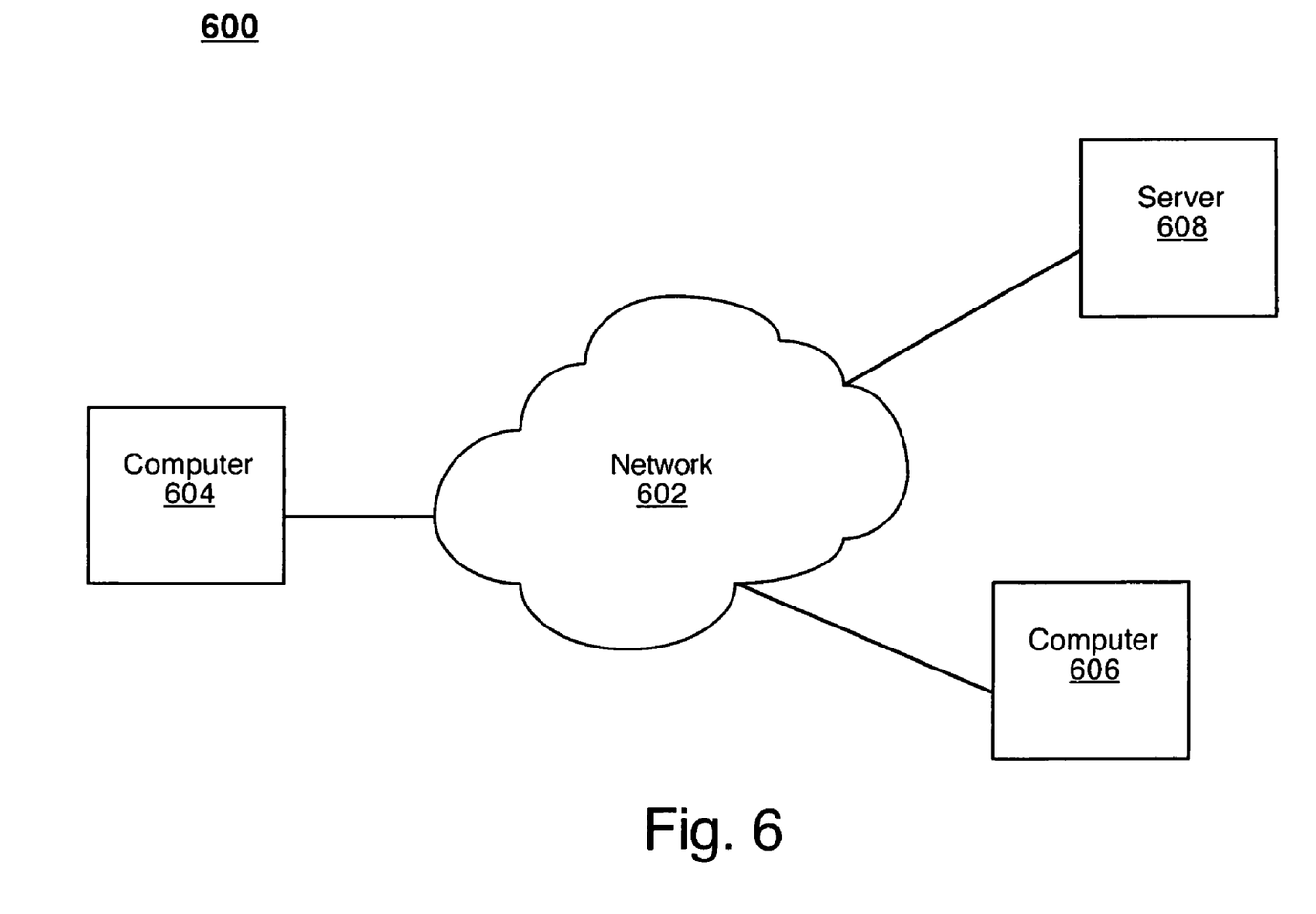
FIG. 6 is a block diagram of an exemplary network that may be utilized in accordance with embodiments of the present invention.

FIG. 6 is a block diagram of an exemplary system 600 that may be utilized in accordance with embodiments of the present invention. For example, computers 604 and 606 may each be utilized to receive one or more fixed electronic template forms from a server 608 via a network 602. It is understood that the fixed electronic template form may enable computers 604 and/or 606 to perform in accordance with one or more embodiments (e.g., methods 100, 300, 400 and/or 500) of the present invention.

Within system 600, server 608 and computers 604 and 606 may be coupled in order to communicate. Specifically, server 608 and computers 604 and 606 are communicatively coupled to network 602. It is appreciated that server 608 and computers 604 and 606 may each be communicatively coupled to network 602 via one or more wired and/or wireless communication technologies.

The network 602 of system 600 may be implemented in a wide variety of ways. For example, network 602 may be implemented as, but is not limited to, a local area network (LAN), a metropolitan area network (MAN), a wide area network (WAN), the Internet, and/or any combination thereof. It is noted that system 600 is well suited to be implemented without network 602. As such, server 608 and computers 604 and 606 may be communicatively coupled via one or more wired and/or wireless communication technologies.

Within FIG. 6, it is understood that system 600 may be implemented to include more or less computers than the two computers (e.g., 604 and 606) shown. Additionally, system 600 may be implemented to include more server devices than the one server device (e.g., 608) shown. It is noted that server 608 and computers 604 and 606 may each be implemented in a manner similar to a computer system 700 of FIG. 7 described herein. However, these devices of system 600 are not in any way limited to such an implementation.

Figure 7:
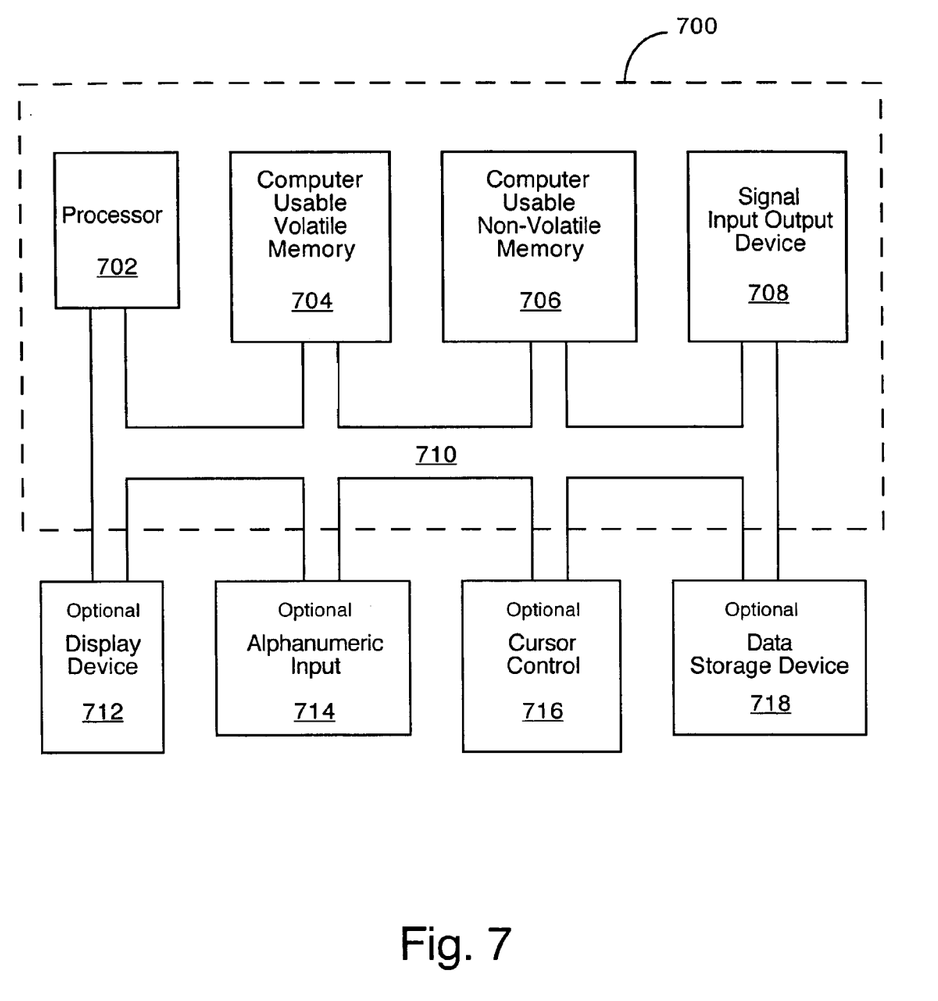
FIG. 7 is a block diagram of an exemplary computer system that may be used in accordance with embodiments of the present invention.

FIG. 7 is a block diagram of an exemplary computer system 700 that may be used in accordance with embodiments of the present invention. It is understood that system 700 is not strictly limited to be a computer system. As such, system 700 is well suited to be any type of computing device (e.g., server computer, desktop computer, laptop computer, portable computing device, database computer, etc.). Within the discussions of embodiments in accordance with the present invention herein, certain processes and operations were discussed that may be realized, in some embodiments, as a series of instructions (e.g., software program) that reside within computer readable memory of computer system 700 and executed by a processor(s) of system 700. When executed, the instructions can cause computer 700 to perform specific operations and exhibit specific behavior which are described herein.

Computer system 700 comprises an address/data bus 710 for communicating information, one or more central processors 702 coupled with bus 710 for processing information and instructions. Central processor unit(s) 702 may be a microprocessor or any other type of processor. The computer 700 also includes data storage features such as computer usable volatile memory 704, e.g., random access memory (RAM), static RAM, dynamic RAM, etc., coupled with bus 710 for storing information and instructions for processor(s) 702, computer usable non-volatile memory 706, e.g., read only memory (ROM), programmable ROM, flash memory, erasable programmable read only memory (EPROM), electrically erasable programmable read only memory (EEPROM), etc., coupled with bus 710 for storing static information and instructions for processor(s) 702.

System 700 of FIG. 7 also includes one or more signal generating and receiving devices 708 coupled with bus 710 for enabling system 700 to interface with other electronic devices. The communication interface(s) 708 may include wired and/or wireless communication technology. For example, in one embodiment of the present invention, the communication interface 708 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 708 may include a cable modem or a DSL modem.

Optionally, computer system 700 can include an alphanumeric input device 714 including alphanumeric and function keys coupled to the bus 710 for communicating information and command selections to the central processor(s) 702. The computer 700 can also include an optional cursor control or cursor directing device 716 coupled to the bus 710 for communicating user input information and command selections to the processor(s) 702. The cursor directing device 716 can be implemented using a number of well known devices such as a mouse, a track ball, a track pad, an optical tracking device, a touch screen, etc. Alternatively, it is appreciated that a cursor can be directed and/or activated via input from the alphanumeric input device 714 using special keys and key sequence commands. System 700 is also well suited to directing a cursor by other means such as, for example, voice commands.

The system 700 of FIG. 7 can also include a computer usable mass data storage device 718 such as a magnetic or optical disk and disk drive (e.g., hard drive or floppy diskette) coupled with bus 710 for storing information and instructions. An optional display device 712 is coupled to bus 710 of system 700 for displaying video and/or graphics. It should be appreciated that optional display device 712 may be a cathode ray tube (CRT), flat panel liquid crystal display (LCD), field emission display (FED), plasma display or any other display device suitable for displaying video and/or graphic images and alphanumeric characters recognizable to a user.

It is noted that the components associated with system 700 described above may be resident to and associated with one physical computing device. However, one or more of the components associated with system 700 may be physically distributed to other locations and be communicatively coupled together (e.g., via a network).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto and their equivalents.

What is claimed is:

1. A method for inserting data into a fixed electronic template page, said method comprising:
    receiving said fixed electronic template page, the fixed electronic template page including a plurality of fields arranged according to a layout of the plurality of fields;
    mapping data to a field of the plurality of fields of said fixed electronic template page;
    making a determination whether said data fits within said field;
    merging a first subset of said data with said field of said fixed electronic template page based on said mapping;
    creating an additional electronic document page that includes an extension area of said field to handle overflow data, the overflow data being a second subset of said data that does not fit within said field;
    merging said overflow data with said extension area of said field of said additional electronic document page; and
    providing, in a manner that preserves the layout of the plurality of fields of the fixed electronic template page, a document that includes the fixed electronic template page with the merged first subset of said data and that includes the additional electronic document page with the merged second subset of said data.

2. The method as described in claim 1, wherein said field comprises a text field.

3. The method as described in claim 1, wherein said field comprises a table.

4. The method as described in claim 1, wherein said additional document page comprises static information also included as part of said fixed electronic template page.

5. The method as described in claim 1, further comprising:
    converting said fixed electronic template page and said additional electronic document page into a format that can be printed.

6. The method as described in claim 1, wherein said merging said first subset of said data comprises embedding a font into said fixed electronic template page.

7. The method as described in claim 6, wherein said embedding said font provides multi-lingual support.

8. A computer system comprising:
    a processor;
    a bus coupled to said processor; and
    a memory device coupled to said bus to communicate with said processor for performing a method comprising:
        receiving a fixed electronic template form page the fixed electronic template page arranged according to a layout;
        converting data into a unified data format;
        binding said data of a database to a field of said fixed electronic template form page;
        making a determination whether said data fits within said field;
        merging a first subset of said data with said field of said fixed electronic template form page based on said binding;

creating an additional electronic document page that includes an extension area of said field to handle overflow data, the overflow data being a second subset of said data that does not fit within said field;

merging said overflow data with said extension area of said field of said additional electronic document page; and providing, in a manner that preserves the layout of the fixed electronic template page without adding an additional field to the fixed electronic template page, a document that includes the fixed electronic template page with the merged first subset of said data and that includes the additional electronic document page with the merged second subset of said data.

9. The computer system of claim 8, wherein said field comprises a text field.

10. The computer system of claim 8, wherein said field comprises a table.

11. The computer system of claim 8, wherein said additional document page comprises a description of said data also included as part of said fixed electronic form page.

12. The computer system of claim 8, wherein said method further comprising:
converting said fixed electronic form page and said additional electronic document page into a format that can be printed.

13. The computer system of claim 8, further comprising embedding fonts into said fixed electronic form page.

14. The computer system of claim 8, wherein said creating an additional electronic document page further comprises:
duplicating the format and static information of said fixed electronic template form page.

15. A computer readable medium having computer readable code embodied therein for causing a computer system to perform a method comprising:
receiving a fixed electronic page via a network, the fixed electronic page being configured with a field followed by at least a second field;
converting data into a unified data format;
linking said data to a field of said fixed electronic page;
making a determination whether said data fits within said field;
merging a first subset of said data with said field of said fixed electronic page based on said linking;
creating an additional electronic document page that includes an extension area of said field to handle overflow data, the extension area following the second field and the overflow data being a second subset of said data that does not fit within said field;
merging said overflow data with said extension area of said field of said additional electronic document page; and
providing a document that includes the fixed electronic template page with the merged first subset of said data and that includes the additional electronic document page with the merged second subset of said data.

16. The computer readable medium of claim 15, wherein the field comprises a text field.

17. The computer readable medium of claim 15, wherein said field comprises a table.

18. The computer readable medium of claim 15, wherein said additional document page comprises letterhead information also included as part of said fixed electronic form page.

19. The computer readable medium of claim 15, wherein said creating an additional electronic document page further comprises:
calculating the font size and spacing for said additional electronic document page.

20. The computer readable medium of claim 15, wherein merging said first subset of said data comprises embedding a font into said fixed electronic form page.

21. The computer readable medium of claim 20, wherein said embedding said font provides multi-lingual support.

22. The computer readable medium of claim 15, wherein said additional document page comprises additional static information also included as part of said fixed electronic template page.

23. The computer readable medium of claim 15, wherein the method further comprises converting said fixed electronic page and said additional electronic document page into a format that can be printed.

* * * * *

UNITED STATES PATENT AND TRADEMARK OFFICE
CERTIFICATE OF CORRECTION

PATENT NO. : 7,996,759 B2  
APPLICATION NO. : 11/227948  
DATED : August 9, 2011  
INVENTOR(S) : Elkady Page 1 of 1

It is certified that error appears in the above-identified patent and that said Letters Patent is hereby corrected as shown below:

On the Title Page, Item (73) under "Assignee", line 1, delete "Internatonal" and insert -- International --, therefor.

On front page, in column 2, under "Other Publications", line 1, delete "Technonlogy," and insert -- Technology, --, therefor.

On front page, in column 2, under "Other Publications", line 2, delete "Technonlgy" and insert -- Technology --, therefor.

In column 12, line 7, delete "Adobes" and insert -- Adobe® --, therefor.

In column 20, line 16, in Claim 16, delete "the" and insert -- said --, therefor.

Signed and Sealed this  
Tenth Day of April, 2012

David J. Kappos  
*Director of the United States Patent and Trademark Office*